United States Patent
Prinz

[19]

[11] Patent Number: 5,884,410
[45] Date of Patent: Mar. 23, 1999

[54] SENSING SYSTEM FOR COORDINATE MEASURING EQUIPMENT

[75] Inventor: Reinhard Prinz, Aalen, Germany

[73] Assignee: Carl-Zeiss-Stiftung, Germany

[21] Appl. No.: 767,887

[22] Filed: Dec. 17, 1996

[30] Foreign Application Priority Data

Dec. 21, 1995 [DE] Germany .................. 195 47 977.7

[51] Int. Cl.[6] .................................................. G01B 7/004
[52] U.S. Cl. .............................. 33/559; 33/561; 33/556; 33/558
[58] Field of Search .............................. 33/559, 560, 561, 33/556, 557, 558, 503

[56] References Cited

U.S. PATENT DOCUMENTS

| | | |
|---|---|---|
| 4,118,871 | 10/1978 | Kirkham . |
| 4,397,188 | 8/1983 | Bansevichus et al. ..................... 33/561 |
| 5,001,464 | 3/1991 | Tanaka ...................... 33/561 |
| 5,012,591 | 5/1991 | Asakawa .................... 33/561 |
| 5,109,610 | 5/1992 | Johnson ...................... 33/556 |
| 5,247,751 | 9/1993 | Ohya et al. ................... 33/558 |
| 5,659,969 | 8/1997 | Butler et al. ................ 33/559 |

FOREIGN PATENT DOCUMENTS

| | | |
|---|---|---|
| 0420416 | 8/1990 | European Pat. Off. . |
| 9105459 | 4/1991 | Germany . |
| 2136573 | 9/1984 | United Kingdom ..................... 33/556 |
| 2141546 | 12/1984 | United Kingdom ..................... 33/556 |
| 89 11631 | 5/1989 | WIPO . |

OTHER PUBLICATIONS

Eupopean Search Report in corresponding European Application EP96 11 8190, dated 23 Mar. 1998.

*Primary Examiner*—Christopher W. Fulton

[57] ABSTRACT

A sensing system has a sensor arranged in the immediate neighborhood of a contacting shaped body. The sensor is connected to a circuit which is likewise arranged in the neighborhood of the contacting shaped body and emits electromagnetic radiation when the sensor responds to contact by the contacting shaped body with a surface to be measured.

14 Claims, 3 Drawing Sheets

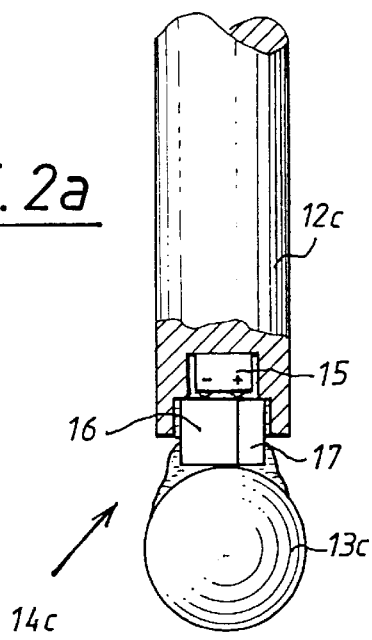
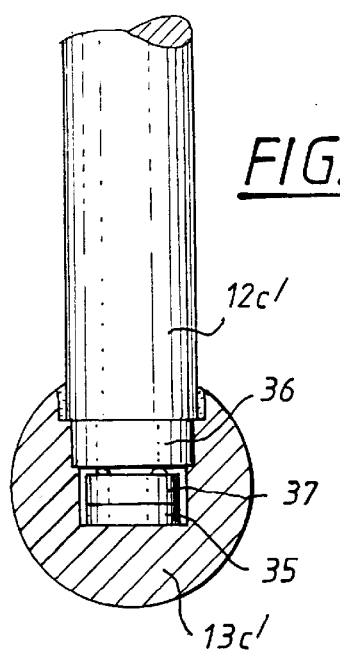
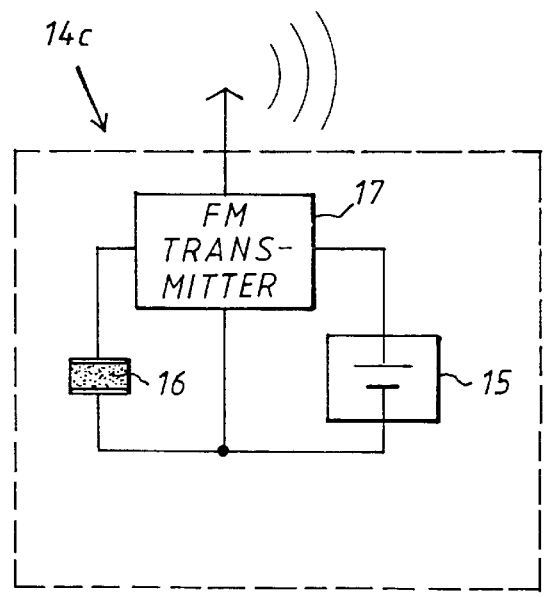

SENSING SYSTEM FOR COORDINATE MEASURING EQUIPMENT

BACKGROUND OF THE INVENTION

1. Field of the Invention

The present invention relates to a sensing system for coordinate measuring equipment, and more particularly, to a sensing system with a contact body for contacting the surface of a workpiece to be measured.

Sensing systems for coordinate measuring equipment for tactile measurement of workpieces may be divided into two classes: sensing heads of the so-called measuring type and those of the switching type. While sensing heads of the measuring type constantly provide a signal which is proportional to the deflection of the resiliently mounted tracer pin, and are thus also suitable for the continuous tracing of workpiece surfaces in so-called scanning operation, sensing heads of the switching type produce a pulse signal on contact with the workpiece. In this latter case, the workpiece surface must be newly contacted at each point at which its position or shape is to be determined.

Switching sensing systems usually have an electromechanical switch contact in the mounting for a resiliently received tracer pin. This switch contact is adjusted very sensitively and opens as soon as the tracer pin, on contact with the workpiece, moves relative to the portion of the sensing head which is fixed to the machine.

To increase the sensitivity of such sensing heads, it has also already been proposed to build highly sensitive, e.g., piezoelectric, sensors into the tracer pin carrier or into the tracer pin itself, in order to be able to detect the contact with the workpiece as soon as there is the smallest reaction force between the workpiece and the contacting shaped body, that is, the sensing ball. Such a sensing head is described, for example, in German Patent DE-PS 27 12 181 (U.S. Pat. No. 4,177,568) and German Laid-Open Patent Applications DE-OS 28 20 813, DE-OS 33 09 122. Nevertheless, even with these sensing heads, the instant of contact cannot be reliably and precisely determined. There are several reasons for this. Firstly, a delay time occurs, particularly with long tracer pins, between the first contact with the workpiece and the response of the sensor, due to the travel time of the pressure wave or sound wave from the contacting shaped body to the sensor, dependent on the materials used for the tracer pin or its extension, etc. Furthermore, the sound wave produced on contact can be attenuated by destructive interference on its path to the sensor. This becomes in particular noticeably disadvantageous, for example, in sensing weak materials, when only a very small amount of mechanical impact energy is transmitted. Instead of perceiving the sound wave, the sensor first perceives the static pressure which builds up very much later, and which arises when the sensing head travels further on the workpiece surface.

It has also already been proposed to arrange the sensor in the neighborhood of the contacting shaped body (FIG. 8 in the first-mentioned DE-PS 27 12 181). However, such tracer pins have not yet been reduced to practice. This is because, on the one hand, the wiring and reliable contacting arrangements for tracer pins, which as a rule are interchangeable, gives rise to noticeable signal conduction problems; and on the other hand, several tracer pins are often built into complex sensor configurations on the sensing head and cannot be immediately connected in parallel with the signal leads of the sensors. The sensor is therefore usually arranged on the sensing head side of the place for change-out of tracer pins, and solutions for the problems relating to the propagation delays of sound and to signal intensity are found in other ways.

Furthermore, it has been proposed to determine the instant of contact precisely with interferometric sensors which measure a mirror surface on the contacting shaped body through the hollow tracer pin, as is described, for example, in German Patent DE-PS 39 20 716 and German Laid-Open Patent Application DE-OS 42 44 240. However, this solution is obviously not particularly well suitable for either interchangeable tracer pins or for the simultaneous attachment of several tracer heads to the sensing head of a coordinate measuring device.

Finally it is also known to measure workpieces directly on the processing machine, in that a sensing head is inserted, instead of the processing tool, in the Morse cone of the tool holding fixture. As a rule, battery-powered, self-contained sensing heads are used for this purpose, since no electrical leads for current supply and signal transmission are provided in this location. With such sensing heads, the sensing signal is then transmitted from the sensing head to the machine tool by radio or infrared radiation or even inductively. Such connecting sensing heads for machine tools are described, for example, in German Laid-Open Patent Application DE-OS 34 22 102 and U.S. Pat. Nos. 4,608,763; 4,509,266; 4,578,874; and 4,670,989. However, all of the sensing heads described therein use a switching contact located in the mounting of the moving tracer pin to generate the contact pulse, which is then transmitted further by radio means. The problems mentioned hereinabove relating to the distance between the sensor and contacting shaped body are neither solved nor addressed, since the requirements for sensors used on machine tools are basically set lower as regards contact accuracy than for sensing heads which are used on coordinate measuring devices.

SUMMARY OF THE PRESENT INVENTION

The present invention has as its object to provide for coordinate measuring equipment a sensing system with which the instant of contact can be determined as accurately as possible.

This object is attained according to the present invention with the following features: A contact body is arranged for contacting a surface to be measured. A sensor is arranged in the neighborhood of the contact body. A circuit is connected to the sensor and arranged in the neighborhood of the contact body. The circuit is arranged to emit electromagnetic radiation when the sensor responds to contact by the contact body with the surface to be measured.

Since the sensor is arranged in the neighborhood of the contact body (e.g. contacting shaped body), the problems of the kinds mentioned hereinabove, arising due to sound propagation times, destructive interference, etc., do not arise. Furthermore, wiring of the sensors is dispensed with, and instead, each sensor has its own transmitter. The sensors are thus decoupled and several tracer pins can immediately be connected in common to one sensing head. In addition, contact problems, even after multiple changes of the tracer pins, are excluded.

Thus, according to the invention, instead of traversing the distance between the contact body and the sensor at the speed of sound, the distance between the contact body and the sensor is traversed at the speed of light, which is much higher than the speed of sound. The electromagnetic wave produced in the neighborhood of the contact body is propagated at the speed of light. The transmitter required for this purpose preferably operates in the region above 10 MHz, for example in the ultrashort wave region. Such transmitters can be produced inexpensively and simply and also with the required small dimensions, and can be integrated into the tracer pin. The receiver circuit for the electromagnetic wave which represents the contact signal can be arranged either in the sensing head itself or else, for example, in the measuring arm, or in the control electronics of the coordinate measuring equipment. The only limitation on the arrangement of the receiver is that excessively wide paths are to be avoided to the extent possible, so that the system can operate with very low transmitter power which, for example, is derived from the impact pulse between the contact body and the workpiece.

As a source of energy or the energy store for the operation of the transmitter circuit, batteries may be used, or capacitors which are for example recharged by means of a solar cell, or by a piezoelectric crystal that functions at the same time as the sensor for the sensing signal. These energy stores are likewise advantageously integrated in the immediate neighborhood of the contact body, for example in the tracer pin. The previously mentioned possibility of charging the energy store by means of the impact energy of the contact process, converted by the piezoelectric sensor into an electronic signal, is particularly advantageous, since no additional energy sources are then required.

BRIEF DESCRIPTION OF THE DRAWINGS

Preferred embodiments of the invention will now be described taken together with the accompanying drawings, in which:

FIG. 2a is an enlarged view of the tracer pin (12c) of FIG. 1;

FIG. 2b is an alternative embodiment of the tracer pin (12c) of FIG. 2a;

FIG. 3 is a block circuit diagram of the electronic components of the sensing system according to FIG. 1.

DETAILED DESCRIPTION OF PREFERRED EMBODIMENTS

Figure 1:
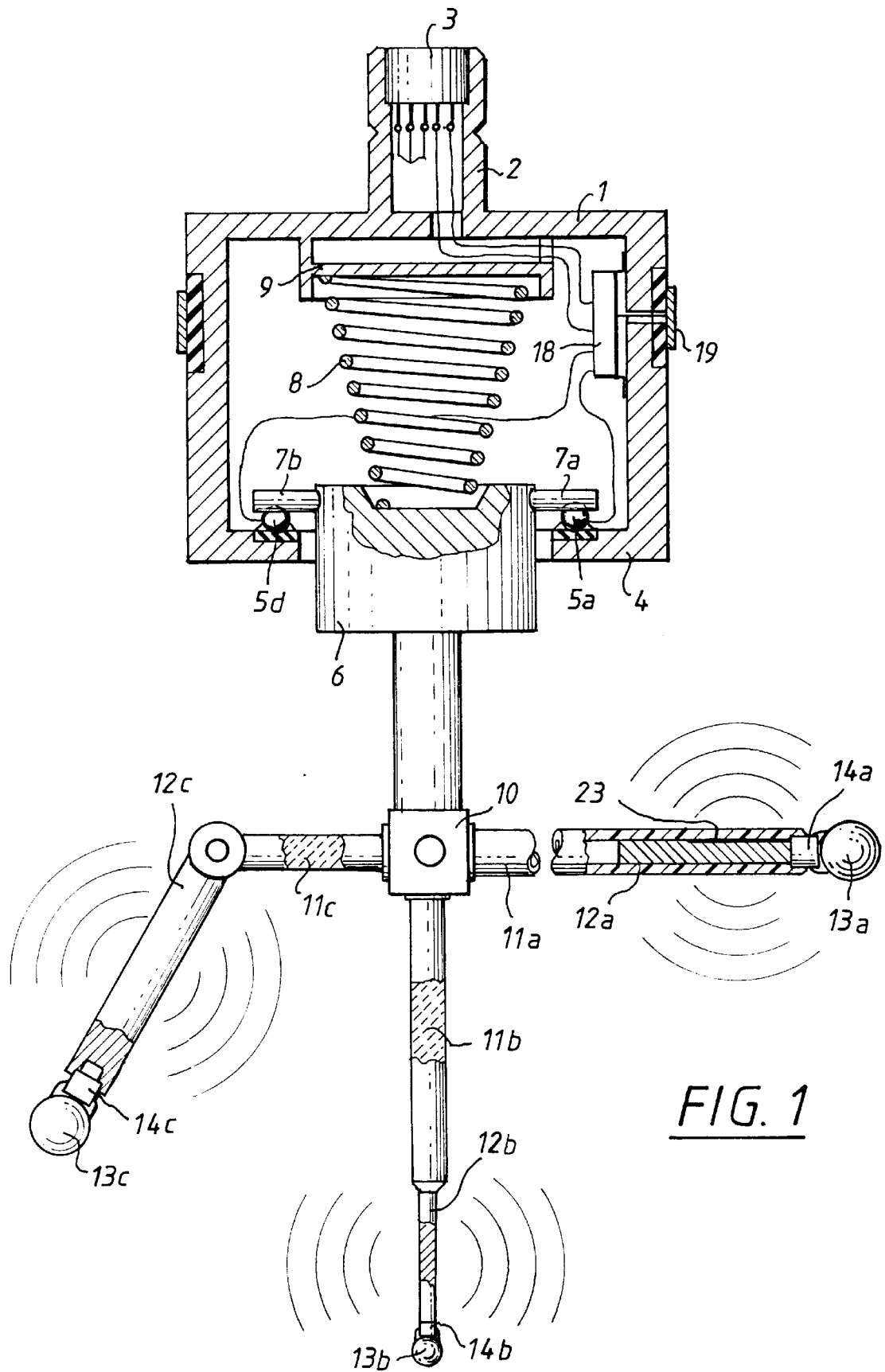
FIG. 1 is a simplified sketch of the mechanical components of a scanning system according to the invention, for coordinate measuring equipment.

The sensing system shown in FIG. 1 essentially consists of a sensing head (1) with a cylindrical housing that can be set, by means of a likewise cylindrical mounting stud (2), on the measuring arm of a coordinate measuring equipment. A plug (3) is integrated into the mounting stud (2) for the transmission of electrical supply leads, signal leads, etc. These plug contacts are connected to a circuit (18) in the sensing head, which is further described below.

The cylindrical housing (1) is open on the floor side and is provided with an annular support (4) into which three ball pairs are secured, which are mutually offset by 120° and are insulated. The portion (6) of the sensing head which can be deflected, the so-called tracer pin carrier, is mounted, statically well defined, in the notches formed by these pairs of balls, by means of three radially outstanding cylindrical bodies (7a–c), and is pressed into this mounting by a spring (8) which is supported against a plate (9) at the other end of the housing (1).

Several tracer pin extensions (11a, 11b, 11c) are interchangeably attached to the tracer pin carrier (6) by means of a mounting cube (10).

These extensions consist, for example, of carbon fiber composite tubes (11a), or of ceramic or metal cylinders (11c, 11b). The tracer pins proper (12a, 12b, 12c) are set on the extensions, with the contacting shaped body, that is, the sensing ball (13a, 13b, 13c), which is of a hard material such as, for example, sapphire; the last tracer pin (12c) is set by means of a joint which enables the tracer pin (12c) to be aligned at an angle.

As can be gathered from the enlarged illustration of FIG. 2, the sensing ball (13c) is attached, not directly to the metallic tracer pin, but via a component (14c). This component (14c) consists of a piezoelectric crystal (16) and, directly joined to this, a silicon substrate in which the essential parts of a high frequency transmitter circuit (17) are integrated. This substrate is combined with the remaining components of the miniature high frequency transmitter (17), such as, for example, the quartz crystal and the coil, to form a thick film circuit (17), which is supplied with power by a micro-battery (15) likewise received in the sensing head. The block circuit diagram of this electronic arrangement is shown in FIG. 3.

The activation of the transmitter circuit (17) by the signal of the piezoelectric element (16) occurs as soon as the sensing ball (13c) comes into contact with the surface of the workpiece to be measured. The transmitter circuit operates at a frequency above 10 MHz and emits electromagnetic radiation for an adjustable time, to be detected, for example, by a receiver in the sensing head (1), as further described hereinbelow. The duration of the transmitting time can be set from a few $\mu$sec up to about 1 second, depending on the voltage supply effected. A duration of 10 $\mu$sec for the transmitter pulse is sufficient to be reliably detected. The metallic tracer pin (12c) acts as an antenna.

Corresponding piezoelectric sensors with high frequency transmitter circuits (14a, 14b) are provided at the connecting points of the tracer pin (12a) to the sensing ball (13a) and tracer pin (12b) to the sensing ball (13b). The piezoelectric sensors are activated for a short time by the contact of the sensing ball with the workpiece. In the tracer pin (12a) consisting of a hollow carbon fiber composite tube, an additional wire (23) is secured in place and acts as a transmitter antenna. The high frequency pulse produced by the contacting process is detected by a receiver circuit (18) in the scanning head (FIG. 1). For this purpose, the circuit (18) is connected to an annular antenna (19) placed around the housing (1). The block circuit diagram of the receiver circuit is shown in FIG. 3. The circuit is a conventional FM receiver (20), tuned to the transmitter frequency and having its output connected to a logic circuit (21). The logic circuit generates a digital contact signal as soon as a given minimum number of oscillations at the resonance frequency of the FM receiver have been detected, for example, seven oscillations. This signal acts (similarly to the signal of the piezoelectric sensors of conventional switching sensing heads) to maintain or intermediately store the relevant signals in the control of the coordinate measuring equipment which describe the momentary position of the measuring slide. Whether or not the sensing is valid is determined by means of verifying circuits, which are likewise known per se. For this purpose, the logic circuit (21) is connected to the series connected switching contacts (5, 7), that is, with the three pairs of balls which form the mountings for the cylindrical pins (7a–c) of the movable tracer pin carrier.

Figure 4:
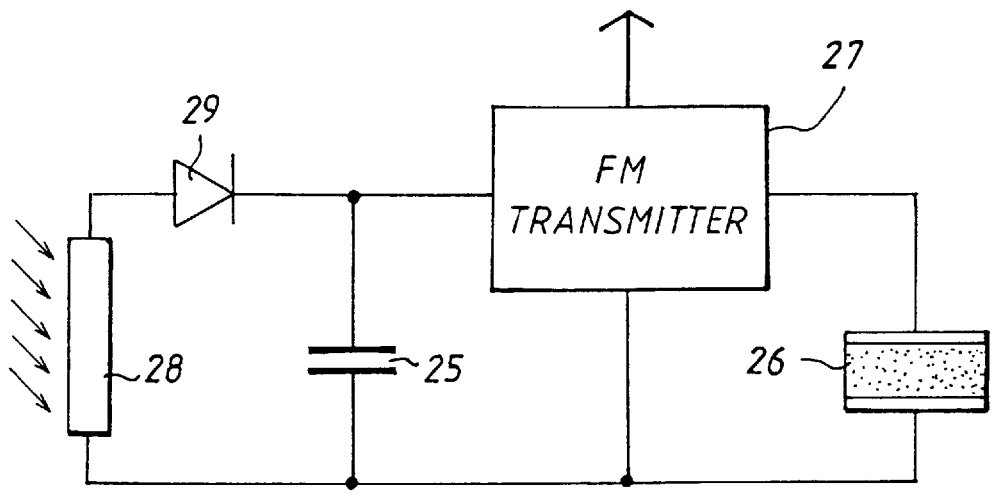
FIGS. 4 & 5 are block circuit diagrams of alternative embodiments of the transmitter electronics (14c) of FIG. 3.

In the preceding preferred embodiments, a miniature battery was used for the energy supply for the transmitter circuit (17). Such a battery performs its task over a period of several years. The sensor equipped with it of course then must be changed. However, it is also possible, as illustrated in FIG. 4, to provide a capacitor (25) as an energy store, as used for example in solar wristwatches, and to recharge the capacitor (25) by means of a solar cell (28) fitted to the outside of the tracer pin, as shown in FIG. 4. A diode (29) is provided for the discharge protection of the capacitor (25). The high frequency circuit is designated by reference number (27), and the piezoelectric crystal is designated by number (26).

Figure 5:
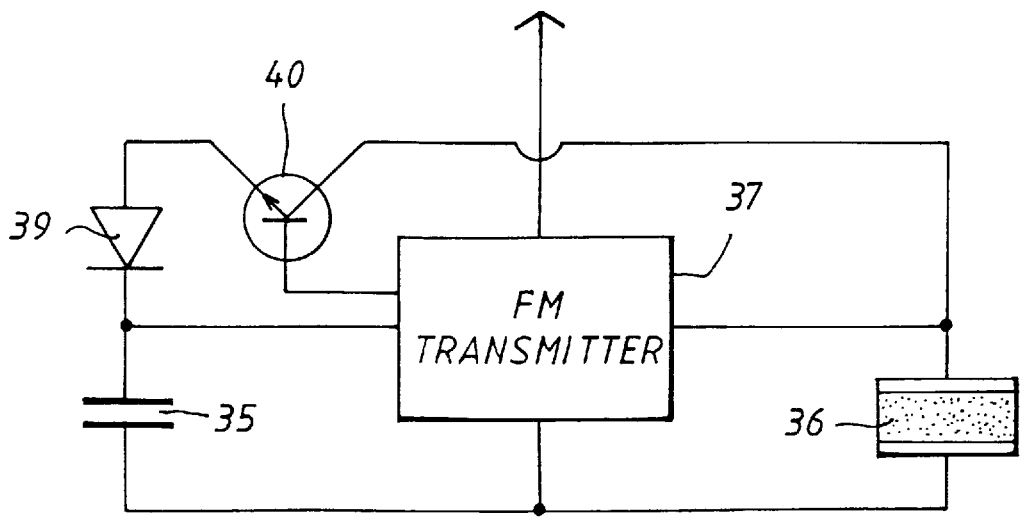

The solar cell is dispensed with, in the particularly advantageous embodiment according to FIG. 5. Instead of a solar cell, the capacitor (35) is charged via the discharge protection diode (39) by the excess energy arising during the contacting process from the piezoelectric crystal (36), which already serves as the sensor. The basic charging of the capacitor (35) can also take place by means of noise pulses which arise when the coordinate measuring equipment travels, or can take place by an initializing run in which the workpiece or another object is contacted several times in quick succession. To prevent the contact pulse or the contact signal of the piezoelectric sensor (36) from being damped by the storage capacitor (35) in the initial phase, an electronic switch (40) is provided which releases the contact between the piezoelectric sensor (36) and the capacitor (35) with a time delay, so that the rising flank of the contact signal is available, undamped, for the immediate starting of the high frequency oscillator in the circuit (37).

In the example of the mechanical embodiment according to FIG. 2b, the sensing ball is provided with a bore in which a storage capacitor (35) is inserted, as is also the thick film circuit (37) of the transmitter circuit. The piezoelectric crystal (36) is secured in the portion of the bore which lies above the thick film circuit (37), has a somewhat larger diameter, and is connected to the front end of the tracer pin (12c).

In the preceding descriptions of preferred embodiments, the sensor is connected to a high frequency circuit. Instead, however, a circuit can be used which emits an optical signal, for example, an infrared signal.

I claim:

1. A sensing system for coordinate measuring equipment, comprising:
    a sensing head (1) with a tracer pin (12a, b, c) that is deflectable with respect to said sensing head,
    a contact body (13a, b, c) arranged for contacting a surface to be measured and arranged at a first end of said tracer pin,
    a sensor (16, 26, 36) arranged at said first end of said tracer pin in the neighborhood of said contact body, and
    a circuit (17, 27, 37) connected to said sensor and arranged at said first end of said tracer pin in the neighborhood of said contact body, wherein said circuit (17, 27, 37) is arranged to emit an electromagnetic radiation when said sensor (16, 26, 36) responds to contact by said contact body (13a–c) with said surface to be measured.

2. The sensing system according to claim 1, wherein said sensor (16, 26, 36) comprises a piezoelectric crystal.

3. The sensing system according to claim 1, wherein said circuit (17, 27, 37) comprises a high frequency circuit.

4. The sensing system according to claim 3, wherein said circuit (17, 27, 37) operates at frequencies above 10 MHz.

5. The sensing system according to claim 1, wherein said coordinate measuring equipment comprises a sensing head, a measuring arm, control electronics for said coordinate measuring equipment and a receiver circuit (20) for detection of said electromagnetic radiation arranged in said sensing head or said measuring arm or said control electronics.

6. The sensing system according to claim 5, wherein said coordinate measuring system further comprises a mount for a resiliently mounted portion of said sensing head, a switch or a switch contact (5, 7) associated with said mount, and a logic circuit (21) connected to said switch or switch contact (5, 7) and to said receiver circuit (20).

7. The sensing system according to claim 1, further comprising an energy store (15, 25, 35) arranged in the neighborhood of said contact body, and connected to said circuit (17, 27, 37).

8. The sensing system according to claim 7, wherein said energy store (25) comprises a solar cell and a capacitor that is recharged by means of said solar cell.

9. The sensing system according to claim 7, wherein said energy store (25) comprises a piezoelectric crystal and a capacitor that is recharged by means of said piezoelectric crystal.

10. The sensing system according to claim 1, wherein at least one of said sensor (36) and said circuit (37) is arranged in a recess in said contact body (13c).

11. A process for generation of a contacting signal during contact sensing of surfaces with a sensing head of coordinate measuring equipment, comprising:
    contacting a surface to be measured with a contact body of said sensing head,
    at least partially converting impact energy produced during contact between said surface and said contact body into electromagnetic radiation, and
    transmitting said electromagnetic radiation by radio without a further energy source.

12. The process according to claim 11, wherein said conversion of impact energy into electromagnetic radiation takes place in the neighborhood of said contact body.

13. A sensing system for coordinate measuring equipment, comprising:
    a sensing head (1) with a tracer pin (12a, b, c) that is deflectable with respect to the sensing head,
    a contact body (13a, b, c) arranged for contacting a surface to be measured and arranged at a first end of the tracer pin,
    a sensor (16, 26, 36) arranged at said first end of said tracer pin in the neighborhood of said contact body,
    a circuit (17, 27, 37) connected to said sensor and arranged at said first end of said tracer pin in the neighborhood of said contact body, wherein said circuit (17, 27, 37) is arranged to emit an electromagnetic radiation when said sensor (16, 26, 36) responds to contact by said contact body (13a–c) with said surface to be measured, and
    an energy store arranged at said first end of said tracer pin in the neighborhood of said contact body and connected to said circuit (17, 27, 37), wherein said energy store (25) comprises a solar cell and a capacitor that is recharged by means of said solar cell.

14. A sensing system for coordinate measuring equipment, comprising:
    a sensing head (1) with a tracer pin (12a, b, c) that is deflectable with respect to the sensing head,
    a contact body (13a, b, c) deflectable with respect to the sensing head,
    a sensor (16, 26, 36) arranged at said first end of said tracer pin in the neighborhood of said contact body,
    a circuit (17, 27, 37) connected to said sensor and arranged at said first end of said tracer pin in the neighborhood of said contact body wherein said circuit (17, 27, 37) is arranged to emit an electromagnetic radiation when said sensor (16, 26, 36) responds to contact by said contact body (13a–c) with said surface to be measured, and an energy store arranged at said first end of said tracer pin in the neighborhood of said contact body and connected to said circuit (17, 27, 37), wherein said energy store (25) comprises a piezoelectric crystal and a capacitor that is recharged by means of said piezoelectric crystal.

* * * * *